(12) United States Patent
Hamilton

(10) Patent No.: US 10,800,713 B2
(45) Date of Patent: Oct. 13, 2020

(54) COMPOSITION, SYSTEM, AND METHOD FOR THE PROMOTION OF SOIL HEALTH

(71) Applicant: RESPOND GROWING SOLUTIONS LIMITED, Hamilton (NZ)

(72) Inventor: Dugald Ross Hamilton, Hamilton (NZ)

(73) Assignee: RESPOND GROWING SOLUTIONS LIMITED, Gisborne (NZ)

( * ) Notice: Subject to any disclaimer, the term of this patent is extended or adjusted under 35 U.S.C. 154(b) by 0 days.

(21) Appl. No.: 16/624,950

(22) PCT Filed: Jun. 22, 2018

(86) PCT No.: PCT/NZ2018/050087
§ 371 (c)(1),
(2) Date: Dec. 20, 2019

(87) PCT Pub. No.: WO2018/236227
PCT Pub. Date: Dec. 27, 2018

(65) Prior Publication Data
US 2020/0140350 A1    May 7, 2020

(30) Foreign Application Priority Data
Jun. 22, 2017 (NZ) .......................... 733015

(51) Int. Cl.
*C05F 11/08* (2006.01)

(52) U.S. Cl.
CPC .................... *C05F 11/08* (2013.01)

(58) Field of Classification Search
CPC .......... C05F 11/08; C05F 11/00; C05F 11/02; C05D 9/00; Y10S 71/903; A01N 63/04; A01N 63/00
See application file for complete search history.

(56) References Cited

U.S. PATENT DOCUMENTS

| | | | |
|---|---|---|---|
| 5,021,350 A | 6/1991 | Jung et al. | |
| 5,888,500 A * | 3/1999 | Marshall | A01N 25/08 424/405 |
| 2007/0110725 A1* | 5/2007 | Brower | A01N 63/04 424/93.3 |
| 2009/0308121 A1 | 12/2009 | Reddy et al. | |
| 2012/0304718 A1 | 12/2012 | Cheiky et al. | |

OTHER PUBLICATIONS

International Search Report and Written Opinion for PCT/NZ2018/050087, dated Sep. 11, 2018.
International Preliminary Report on Patentability for PCT/NZ2018/050087, dated May 30, 2019.

* cited by examiner

*Primary Examiner* — Jennifer A Smith
(74) *Attorney, Agent, or Firm* — Pilloff Passino & Cosenza LLP; Sean A. Passino; Rachel K. Pilloff

(57) ABSTRACT

The present invention relates to a composition, system and method for the promotion of soil health, and hence plants grown in the soil treated with the composition. The present invention may be used for the improvement of soils that are deficient in or depleted of nutrients, minerals, microorganisms or moisture (or any one or more of these), and are in need of "rehabilitation." However, the invention is equally suited to establishing and maintaining the health of any soil (and plant) ecosystem. The composition includes live nitrogen-fixing bacteria and fungi that form symbiotic relationship with plants to increase the bioavailability of nitrogen in the soil.

20 Claims, 9 Drawing Sheets

COMPOSITION, SYSTEM, AND METHOD FOR THE PROMOTION OF SOIL HEALTH

STATEMENT OF CORRESPONDING APPLICATIONS

This application is based on the provisional specification filed in relation to New Zealand Patent Application No. 733015, the entire contents of which are incorporated herein by reference.

TECHNICAL FIELD

The present invention relates to a composition, system and method for the promotion of soil health, and hence plants grown in the soil treated with the composition. The present invention has particular application to the improvement of soils that are deficient in or depleted of nutrients, minerals, microorganisms or moisture (or any one or more of these), and are in need of "rehabilitation." However, the invention is equally suited to establishing and maintaining the health of any soil (and plant) ecosystem.

BACKGROUND ART

The health of soil depends in large measure on the nutrients, elements, minerals, and microorganisms therein (hereinafter collectively referred to as "nutrients") and its water content. The health of soil in turn largely determines its fertility; that is to say, its ability to promote and sustain the growth and health of plants. This is because plants require these nutrients for sustenance. Some nutrients that are important for soil and plant health include phosphorus, potassium, zinc, copper, and nitrogen, among others.

Nitrogen is particularly important for plant growth, and assuming there is no application of nitrogen-containing fertilisers, this important nutrient is largely sourced from the surrounding air. The nitrogen is drawn from the air into the soil (known as "fixing" the nitrogen in the soil).

This occurs by means of nitrogen-fixing bacteria (NFB) which are present in the soil. NFB attract nitrogen gas from the air into the soil, and release enzymes (known as nitrogenases) which react chemically with the nitrogen gas to form nitrogen compounds such as ammonium, nitrates or nitrites.

Upon the death of the NFB (notably by being consumed by "predators" in the soil, such as Protozoa, nematodes, microarthropods and worms), the nitrogen compounds are released into the soil.

It follows that healthy levels of nitrogen (in the form of nitrogen compounds) in soil are closely related to the presence of adequate levels of NFB therein; that is to say, levels of NFB which facilitate nitrogen-fixing at a rate that is sufficient for the health of a given type of soil.

However, the fertility of soil does not depend merely on the quantity of the above-mentioned nutrients. In order for these nutrients to provide nourishment to plants growing in the soil, i.e. for the soil to be sufficiently "fertile", they must be transformed into a "plant-available form", able to be ingested by plants via their roots. This may relate to the chemical form of the nutrients, and/or to the physical proximity of the nutrients to the plant roots.

Certain types of fungi may be present in the soil which act to render nutrients in the soil into a plant-available form. The fungi are able to do so both on a chemical and/or a physical level.

On a chemical level, the fungi release carbon-containing compounds which react with microorganisms in the soil to transform certain nutrients therein into a chemically plant-available form. The fungi then store these nutrients in this form until they are required by the plant.

The fungi also release chemical compounds, such as glomalin, into the soil, which contributes to better soil structure and higher organic matter content. This in turn may result in more nutrients becoming potentially available to plants.

On a physical level, fungi have long, porous filaments at their ends known as "hyphae," through which the nutrients can be absorbed from the soil. Populations of fungi tend to develop networks, or "lattices," of hyphae in the soil. The hyphae effectively act as "highways" via which nutrients which would otherwise be beyond the physical reach of the roots may flow to them, and thereby be ingested by the plants.

Furthermore, some types of fungi may also integrate with the physical structure of the plant roots in what are known as "arbuscule". These are branch-like formations formed between the cells of the plant root. The arbuscule enable nutrients to be delivered to the plant roots even more efficaciously.

Among the nutrients delivered to the plant via the action of the fungi are the nitrogen compounds (such as ammonium) released into the soil upon the death of the NFB. These travel along the "highways" formed by the hyphae and arbuscule of the fungi and are thereby made available to the plants via their roots. Delivery of the nitrogen compounds to the plant in this manner is relatively more effective than their uptake from the soil directly by the plant roots themselves.

Thus it will be understood that the fertility of soil, in terms of availability to plants of nutrients present therein, may be closely related to levels of fungi in the soil.

Furthermore, the fungi develop a "symbiotic" relationship with the plants; providing nutrients in a form accessible to the plants, while the plants in return release sugars and other compounds such as carbon dioxide, on which the fungi thrive (they also use the carbon dioxide for converting further nutrients into a plant-available form, as described above).

It follows that NFB and fungi can be thought of as "facilitators", which operate on the nutrients in the soil and thereby determine its fertility. The respective manner in which NFB and fungi operate on the nutrients can be thought of as their "function" in the soil.

Healthy soils naturally contain adequate levels of both the nutrients and the facilitators (NFB and fungi). However, detrimental factors such as excessive farming practices (or disruption by human activity in general) and adverse environmental conditions (such as pollution or climatic events) can deplete the levels of both nutrients and facilitators, thereby affecting the fertility of the soil and hence the health of plants growing therein.

In light of this, many compositions aimed at improving soil health (such as fertilisers) contain NFB and fungi (or one or the other of these), as well as any admixture of the nutrients discussed above.

It is also known in the art for such compositions to include a "base," via which some or all of the nutrients and facilitators are transported to the soil. The base often takes the form of a porous or pervious substance into which the nutrients and facilitators (or some of the nutrients and/or facilitators) are adsorbed.

The base is beneficial in providing a protective "casing" for the ingredients adsorbed thereinto, both before and after application of the composition. The base assists both with the preservation of the ingredients concerned, and potentially also with their ability to perform their respective functions once in the soil.

Assuming such compositions are administered correctly, once applied the NFB and fungi multiply, i.e. reproduce. As they do so, there is a progressively greater population of NFB and fungi carrying out the respective functions of nitrogen-fixing and transformation of nutrients into a plant-available form.

Existing compositions for the promotion of soil health that include NFB and/or fungi employ these in a "dormant" form; that is to say, the NFB and/or fungi are applied to the soil in the form of, respectively, NFB spores and fungal spores (as opposed to a "live", or germinated, form).

Dormant NFB and fungi are relatively less delicate and more resilient. Thus the preparation and application of compositions involving them is somewhat simplified. For example, the NFB and/or fungi can be sourced in the form of a powder, and mixed with other powdered ingredients using conventional blending methods when preparing the composition.

However, the use of dormant NFB and/or fungi has substantial drawbacks. Dormant NFB and fungi are inactive in terms of their respective functions (which have been discussed above.) They need to germinate before they are able to function. It follows that existing compositions inevitably involve a delay before they become effective following application to soil, while the NFB and fungi germinate.

Furthermore, their successful germination is a delicate process and is contingent on a number of factors, including favourable environmental conditions (often within narrow parameters of acceptability) such as temperature and chemical and other conditions, both ambient and in the soil.

Alternatively, or additionally, some types of NFB and/or fungi may require a triggering event in order to germinate. This triggering event may be in the form of heat or cold shock.

Consequently, it is relatively common that in a given application of conventional compositions, a high proportion of the dormant NFB and/or fungi may fail to germinate or even survive. Thus the eventual functional population of live NFB and/or fungi established in the soil via such compositions may be relatively much smaller than the population of dormant NFB and/or fungi applied via such compositions. This means that there is some wastage when using a conventional composition.

The initial population of live NFB and/or fungi that have successfully germinated, also affects the continued effectiveness of the composition. As discussed above, after successful introduction into the soil, the NFB and/or fungi begin to reproduce.

Reproduction tends to be substantially exponential and it follows that a smaller initial population may translate to a relatively much slower rate of population growth over time; and hence a system that provides nutrients to soil and plants at a relatively much slower rate.

Furthermore, adverse environmental conditions during germination can also affect the functional effectiveness of those NFB and/or fungi that do successfully germinate. NFB and/or fungi that germinate in unfavourable conditions tend to be less effective at their respective functions in the soil than those that germinate in more favourable conditions.

Thus, on the one hand, the levels of nitrogen in the soil may be established at a relatively slower rate; and on the other hand, the nutrients (including nitrogen) may be converted into a plant-available form at a relatively slower rate. It also follows that the fungi may be relatively less effective at establishing a symbiotic relationship with plants.

Therefore it will be understood that applying NFB and/or fungi in a dormant form may lead to significant wastage of ingredients as potentially a large proportion of the dormant NFB and/or fungi fail to germinate due to unfavourable conditions; it also entails a delay while the NFB and/or fungi germinate.

Furthermore, it may result in a significantly smaller initial population of live NFB and/or fungi in the soil (relative to the population of dormant NFB and/or fungi applied), which may have a progressive effect on the population of NFB and/or fungi in the soil over time; in turn affecting the rate at which nutrients are supplied to the soil and plants. In addition, NFB and/or fungi that manage to germinate in spite of unfavourable conditions may be less functionally effective than NFB and/or fungi that have germinated in favourable conditions.

These drawbacks may collectively reduce the effectiveness of the conventional compositions of the prior art; with the further consequence that relatively more frequent repeat applications thereof may be required in order to maintain soil and plant health, entailing increased cost of using these conventional compositions.

It is an object of the present invention to address the foregoing problems with the prior art; or at the very least to provide the public with a useful choice.

All references, including any patents or patent applications that may be cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Further aspects and advantages of the present invention will become apparent from the ensuing description which is given by way of example only.

DISCLOSURE OF THE INVENTION

According to one aspect of the present invention, there is provided a composition to improve or maintain soil health, wherein the composition includes:
 a base;
 nitrogen-fixing bacteria; and
 fungi
 wherein the nitrogen-fixing bacteria and fungi are present in the composition in a live state.

Throughout the present specification, the term "soil" should be understood as meaning the upper layer of earth in which plants or crops may grow or be planted. Typically, soil is comprised of organic matter, clay, rock particles, minerals, organisms, gases and liquids, or any admixture thereof.

Throughout the present specification, reference to "soil health" should be understood as meaning the state of the soil in terms of its content of nutrients, minerals, microorganisms (or any combination thereof—hereinafter collectively referred to as "nutrients") and/or its water content, as well as bacteria and fungi. A person skilled in the art will be familiar with techniques for determining the soil health of a given sample of soil.

Desirable quantities of nutrients, bacteria and fungi may vary depending on the type of soil being considered and/or its intended use, for example in cultivating specific agricultural crops. There may also be other relevant circumstances that need to be considered. Desirable quantities of nutrients, bacteria and fungi having regard to all relevant circumstances will be readily ascertained by the skilled person.

In preferred embodiments of the invention, the composition also includes additional, nutrient-providing ingredients. It will be understood that the nutrient-providing ingredients may be in the form of nutrients themselves (such as boron, minerals and microorganisms); they may be in the form of ingredients which contain nutrients; or they may contain pre-cursors to nutrients which, upon reacting with other chemicals or microorganisms, form the relevant nutrients.

Preferably, the type and quantity of nutrient-providing ingredients included in the composition will be ascertained by the skilled person with regard to the soil health as well as other relevant factors. For example, in a preferred embodiment of the invention, the composition also includes fishmeal (which provides the nutrients of protein and phosphorus), as well as water.

Furthermore, in this embodiment the composition also includes nutrient-providing ingredients that are beneficial for the growth and health of the bacteria and/or fungi of the composition. Specifically, it includes molasses, which provide energy to the bacteria and fungi; and compost and cow manure, which provide sustenance for the bacteria.

The composition also includes "fungi nutrients", these being ingredients which provide essential nutrition to the fungi; in particular, protein (for example, avenalin), fats (such as lipids, waxes or sterols) and b-vitamins. Fungi nutrients which may provide such nutrition may include nuts, seeds, or oats, as well as products comprising or derived from fish, kelp, blood or bone. The skilled person may identify other ingredients that could be suitable for use as fungi nutrients.

It will be understood that in use, the composition, as prepared, is in a liquid form. This is necessary to allow the nitrogen-fixing bacteria and fungi to be present in the composition in a live state. The skilled person will readily envisage specific ways in which the composition may be provided in a liquid form; for instance, simply as a liquid to be poured or sprayed, or in the form of a liquid encased in a capsule, suitable for insertion into the soil.

Throughout the present specification, the term "base" should be understood as meaning an ingredient of the composition that acts to carry, host or otherwise provide a protective environment for some or all of the other ingredients of the composition.

Preferably, the base hosts the relevant ingredients both prior to, and for at least some time after, application of the composition to the soil.

Preferably, the base may have relatively adsorbent, porous and/or pervious properties. This may improve its efficacy as a host for the relevant ingredients. It may also promote substantially uniform distribution of the composition throughout the soil following application, increasing access to the nutrient-providing ingredients by plants. It may also help to "fractionate" the nutrient-providing ingredients, increasing the rate at which they may be consumed by the plants, fungi and/or bacteria.

In a preferred embodiment of the invention, the base hosts the nitrogen-fixing bacteria. This may serve to protect the bacteria from damage, as well as being conducive to their reproduction, such as by allowing "chains" of bacteria to develop within its porous structure. It may also provide an environment that is particularly conducive to the nitrogen-fixing function of the bacteria once the composition is applied to the soil.

In a particularly preferred embodiment, the base also hosts the fishmeal and at least some of the water and molasses. However, it should be understood that this is not intended to be limiting on the composition.

Preferably, the base is introduced at the point of preparation of the nitrogen-fixing bacteria according to the method described further below (that is to say, the cultivation of bacterial spores into a "live" state for inclusion in the composition). However, this is not intended to be limiting.

Preferably, the base is comprised of a carbon-based substance. This may be advantageous as carbon-based substances tend to be long-lasting when applied to soil (i.e. they tend to remain in the soil for a relatively long time without breaking down). They also tend to be natural, meaning their use may be beneficial to the environment as well as potentially giving rise to tax advantages (such as carbon credits).

In a particularly preferred embodiment of the invention, the base is in the form of biochar. This should be understood to be a charcoal product made from biomass via a process called pyrolysis. Biochar is quite porous (and therefore also adsorbent), and hence is relatively very effective for use as a base.

However, this is not intended to be limiting. The skilled person will readily identify other substances that may be suitable for use as a base in the composition of the present invention. For example, it is not inconceivable that the base could comprise pumice, wood (such as woodchips), or other substances having suitable properties.

The base may have the further benefit of reducing damage arising from harmful products, such as undesirable chemicals, that may from time to time become present in the soil, for instance by preventing the runoff of such products into streams or waterways. The base may act to absorb these harmful products due to its porous properties, thereby containing them in the soil and helping to prevent leaching.

Throughout the present specification, the term "nitrogen-fixing bacteria" (NFB) should be understood to mean bacteria that are capable of attracting nitrogen from the air and drawing it into the soil (otherwise known as "fixing" it in the soil) by releasing enzymes (known as nitrogenases) with which the nitrogen gas reacts to form nitrogen compounds such as ammonium, nitrates, or nitrites; which compounds are released into the soil on the death of the NFB.

Preferably, the NFB are from the *Azotobacter* family. Bacteria from this family release several different types of enzymes, thus making them relatively very effective at nitrogen-fixation. They also respire relatively rapidly, meaning they are capable of drawing in air (and hence nitrogen in the air) at a correspondingly rapid rate, and hence ultimately of fixing the nitrogen in the soil relatively quickly.

Furthermore, NFB from the *Azotobacter* family are able to perform the nitrogen-fixing process in the presence of oxygen; and also are "free-living" within the soil; they do not need to be "hosted" by a plant. The versatility of *Azotobacter* makes them particularly effective for use in the present invention.

The use of *Azotobacter* may also be particularly desirable due to the *Azotobacter* releasing growth chemicals that stimulate the proliferation of other desirable organisms in the soil. These chemicals may also be conducive to the efficacy of the fungi of the composition at performing their function in the soil, in particular, rendering nutrients into a plant-available form. This complementary relationship between the *Azotobacter* and the fungi is particularly strong if the fungi are of the Mycorrhizal family, as discussed below.

In a particularly preferred embodiment of the invention, the NFB are *Azotobacter Chroococcum*. This particular type of *Azotobacter* may be relatively very effective for use in the invention as it does not require a triggering event (such as heating) to germinate. In addition, it develops a protective coating, in the style of a "gel," that makes it relatively very durable.

It should also be appreciated that, in addition to NFB, the composition may also contain other bacteria, which may be beneficial to soil and plant health in a number of respects.

It will be understood that the fungi included in the composition are of a kind that establish a symbiotic relationship with plants and are capable of transforming nutrients in the soil (including the nitrogen compounds as fixed in the soil by the NFB) into a plant-available form.

Preferably, the fungi are Mycorrhizal, which form symbiotic relationships with the roots of plants. In a particularly preferred embodiment of the invention, the fungi used in the composition form a symbiotic relationship with the plant is of the type, *Arbuscular Mycorrhizae*. Fungi that are *Arbuscular Mycorrhizae* have hyphae which is able to penetrate the root cells of many plant species, include wheat and rice, and establish arbuscules. Fungi that form this type of symbiotic relationship are from the Glomeromycota phylum or division.

However, the reference to *Arbuscular Mycorrhizae* is not intended to be limiting. It will also be appreciated that the composition may include fungi that form a different type of symbiotic relationship with plants, depending on the species of plant that the composition is intended to be used with.

Not all plant species can form symbiotic relationships with fungi of the *Arbuscular Mycorrhizae* type; for example, if the composition is to be used with pine trees, the fungi may form a symbiotic relationship of the *Ectomycorrhiza* type; this is commonly found in woody plants. The fungi that form these type of relationships tend to be from the Basidiomycota and Ascomycota phylum.

In another example, if the composition is to be used with flowering plants, which includes those bearing blueberries or cranberries, the fungi may be of the Ascomycota phylum, which forms a *Ericoid mycorrhiza* type relationship with the plant.

Ultimately, it will be appreciated that the appropriate fungi needs to be selected in order to form a symbiotic relationship with the target plant species. Plants are typically able to form symbiotic relationships with several different species of fungi within the phyla. Persons skilled in the art will be able to identify specific species of fungi from the appropriate phylum for use in the composition, depending on availability and other relevant factors.

Throughout the present specification, reference to nutrients being in a "plant-available form" should be understood to mean that the nutrients are in a form which plants are able to ingest via their roots. The fungi may transform the nutrients into a plant-available form by interacting chemically with microorganisms in the soil, and/or by forming a physical "highway" (using the hyphae of the fungi) via which the nutrients are able to flow to the plant roots, and thereby be ingested by the plant.

In a particularly preferred embodiment of the invention, the base (which in this embodiment comprises biochar) may also be conducive to the function of the fungi in this regard; in particular, the fungi may travel through the porous structure of the biochar to convey the nutrients to plant roots.

The fungi forms a symbiotic relationship with plants, whereby the fungi supply nutrients in a plant-available form and in return, the plants release compounds such as sugars and carbon dioxide, off which the fungi thrive. This may support the reproduction of the fungi and perpetuates the mutually-beneficial relationship.

Throughout the present specification, reference to the term "live," in relation to fungi and NFB, should be understood as meaning that the fungi and NFB are in a germinated state.

"Live" can be contrasted with "dormant," as that term will be readily understood to one skilled in the art in relation to fungi and NFB. It will be understood that only live (as opposed to dormant) NFB and fungi are capable of performing their respective functions (as discussed above).

Throughout the present specification, reference to the fungi and NFB being "present" in the composition in a live state should be understood to mean that the fungi and NFB are in a live state at the point when all of the ingredients of the composition are being combined; and furthermore that they remain in a live state during application of the composition to the soil, as well as for some time after the composition has been applied to the soil.

In providing a composition in which NFB and fungi are present in a live state, the present invention may have significant advantages over the prior art.

The NFB and fungi have already germinated following application of the composition to the soil; accordingly, the composition may be effective in improving or maintaining soil health from the moment of its application to the soil. This is as opposed to conventional compositions, in which NFB and/or fungi are applied to the soil in a dormant state and hence need time to germinate before they become effective.

Another significant advantage of the composition of the present invention is that the NFB and/or fungi are not vulnerable to climatic conditions (and other such factors) during the delicate germination process. Rather, germination occurs during the preparation of the composition; and can thus be carried out in controlled and favourable conditions. This may enable a relatively much greater percentage of NFB and fungal spores to germinate which potentially reduces wastage of costly ingredients.

Moreover, it may mean that the composition, when applied to soil, will on average have a significantly greater population of germinated NFB and fungi than in the same amount of conventional compositions, in which a relatively high proportion of the NFB and/or fungi applied to the soil may fail to germinate.

Having a greater initial population of NFB and fungi may in turn have a pronounced effect on the continued effectiveness of the composition. Since NFB and fungi reproduce exponentially, a greater initial population may have a progressively greater effect on the population over time. The rate at which nutrients are supplied to soil and plants depends significantly on the population of NFB and fungi present in the soil. Thus the composition of the present invention may become progressively more effective with time (following application), as compared to conventional compositions. It is important to note that the fact that the NFB are consumed by "predators" in the soil has relatively little effect on their rate of population growth. Due to NFB reproducing relatively very quickly, the NFB which are consumed are rapidly replaced by successive "generations".

Effecting the germination of the NFB and fungi in controlled conditions prior to application of the composition may also result in live NFB and fungi which are more "lively" (that is to say, more functionally effective) than NFB and fungi which germinate only after application to soil and hence may be vulnerable to attendant climatic conditions.

Accordingly, the present invention provides a composition that may yield significant benefits for the health of both soil and plants. This potentially includes superior crop yield and quality; superior soil nutrient content and cycling; as well as superior resistance of soil to climatic and other conditions. It also potentially increases the rate of plant establishment and survival at seeding or transplanting.

Furthermore, it may improve the nutrient intake of animals that feed on plants growing (or grown) in the soil; which may in turn reduce methane emissions from those animals. The composition of the present invention may be advantageous whether or not it includes additional nutrient-providing ingredients. If it does contain such ingredients, the fungi may make them available to soil and plants with superior effectiveness. However, the composition of the present invention is also advantageous in cases where, for example, soil is rich in nutrients but poor in fungi; meaning the nutrients remain unavailable to plants. In such cases, the composition of the present invention will supply fungi which may convert the pre-existing nutrients into a plant-available form with superior effectiveness.

The invention facilitates the use of land for farming or crop production that may not have otherwise been suitable previously due to a lack of nutrients in the soil that supported good plant growth. The invention may increase the availability of what nutrients may already be present to help maximise potential plant growth.

According to another aspect of the present invention, there is provided a composition to improve or maintain soil health, wherein the composition includes:
 a base;
 nitrogen-fixing bacteria; and
 fungi
 wherein the composition also includes fungi nutrients.

As indicated above, "fungi nutrients" are ingredients which may provide essential nutrition to the fungi in the composition; in particular by providing protein (preferably avenalin), fats (such as lipids, waxes or sterols) and b-vitamins. This may be conducive to the reproduction and function of the fungi of the composition.

In a preferred embodiment, the fungi nutrients are provided by ingredients such as nuts, seeds, oats, and/or products comprising or derived from fish, kelp, blood or bone. The skilled person may envisage other ingredients which are suitable for use as fungi nutrients. In a particularly preferred embodiment of the invention, the fungi nutrients include ground oats, which contain the protein avenalin as well as a range of other essential nutrition.

In a preferred embodiment, the fungi nutrients are in a ground, powdered, or similar form. This may be advantageous as it may increase the surface area of the fungi nutrients in the composition, thereby allowing them to be accessed and consumed more easily and at a relatively faster rate by the fungi.

In a particularly preferred embodiment, the fungi nutrients are added at the stage of preparing the fungi for use in the composition, in accordance with the method described further below. The inventor has found that including the fungi nutrients when preparing fungi (that is, when causing fungal spores to germinate into a "live" state in accordance with the method below, pending their inclusion in the composition) may significantly improve the rate of successful germination of the fungal spores.

It will be appreciated that the composition may be prepared as subsets, one for the NFB and one for the fungi. The method of preparation of these respective subsets shall now be described, beginning with the NFB.

According to another aspect of the present invention, there is provided a method of preparing nitrogen-fixing bacteria for a composition to improve or maintain soil health, the composition including a base; nitrogen-fixing bacteria; and fungi and wherein the nitrogen-fixing bacteria are present in the composition in a live state, and wherein the method includes the steps of:
 combining nitrogen-fixing bacterial spores and water in a mixture; and
 maintaining the mixture of nitrogen-fixing bacterial spores and water in contact with air until the nitrogen-fixing bacterial spores germinate.

It will be understood that the bacterial spores are of an NFB variety, as discussed earlier in the present specification. Accordingly, reference shall henceforth be made to the bacterial spores being NFB spores.

Preferably, the water employed in the method is rainwater. However, this is not intended to be limiting, and the skilled person will readily identify other types of water (for instance, bore water.

The water may also be tap water, i.e. water from a municipal supply although if it has been chemically treated this may not be conducive to the viability of the bacterial spores) that is suitable for use in the method.

Preferably, the mixture of NFB spores and water are combined by immersing the NFB spores in the water such that the NFB spores are substantially uniformly dispersed or otherwise distributed in the water. However, this is not intended to be limiting.

Throughout the present specification, reference to maintaining the mixture of NFB spores and water in contact with air should be understood as meaning that the NFB spores and water have substantially continuous access to air, and in particular, oxygen.

Preferably, this includes aerating the mixture of NFB spores and water; by which is meant that air is introduced under pressure into the mixture. This may be achieved using, for instance, a fish tank aerator, and/or air stones. However, this is not intended to be limiting; and the method may not include aeration.

Even more preferably, the mixture of NFB spores and water are agitated at the same time as being aerated; either by the aeration itself or by additional means (as will be apparent to the skilled person). However, this is not intended to be limiting.

Preferably, the method also includes the steps of adding further ingredients to the mixture. In a particularly preferred embodiment, when the NFB spores and water are combined, fishmeal and molasses are also added. However, this is not intended to be limiting. Some, all or none of these ingredients may be added; and the skilled person will readily recognise other ingredients that may be added in addition to, or instead of, these. For example, glucose may be added to the mixture; this can help with the establishment and proliferation of the NFB.

In an even more preferred embodiment, biochar is also added after the mixture of NFB spores, water, fishmeal and molasses has been aerated.

More specifically, in this embodiment, 15 grams of NFB spores, 25 grams of fishmeal, and 5 grams of molasses are combined with 15 litres of rainwater to form a solution. About 125 grams of glucose is also added. This solution is then aerated and agitated using a fish tank aerator and, optionally, air stones for a period of 24 hours.

Five kilograms (which is approximately five litres, but there may be variances depending on the amount of carbon content) of biochar is added to the mixture. A sinking lid is placed on top of the solution to submerge the biochar in the solution. The sinking lid also helps to distribute air (and in particular, oxygen) throughout the solution. The solution, which is now approximately 20 litres, is allowed to stand for up to 48 hours, or until it begins to foam.

The inventor has found that, when combined with the fungi subset of the composition, the method of preparation of which is described below, and diluted with 200 litres of water, the resulting mixture is sufficient for adequate coverage of one hectare of land. For smaller areas, the composition may be proportionally reduced as required.

According to another aspect of the present invention, there is provided a method of preparing fungi for a composition to improve or maintain soil health, wherein the fungi are present in the composition in a live state, wherein the method includes the steps of:

contacting fungal spores with water; and maintaining the mixture of fungal spores and water in contact with air until the fungal spores germinate.

As discussed above, it will be understood that the fungal spores are of a species which, when germinated, are capable of transforming nutrients in the soil into a plant-available form by forming the appropriate symbiotic relationship with the target plant species.

As discussed above, the water used is preferably rainwater, although the skilled person will appreciate that other kinds of water, for example water extracted from a bore or a municipal supply (although if the water is chemically treated it may not be suitable), may also be suitable for use in the method.

Preferably, the water is contacted with the fungal spores by being sprayed over them. However, this is not intended to be limiting.

Throughout the present specification, reference to maintaining the mixture of fungal spores and water in contact with air should be understood as meaning that the fungal spores and water have substantially continuous access to air, and in particular, oxygen.

Preferably, the mixture of fungal spores and water are lightly covered by a lid, thereby allowing the fungal spores and water to maintain access to air while also helping ensure the water does not evaporate.

Preferably, the method also includes the steps of adding additional ingredients to the mixture.

In a particularly preferred embodiment, the additional ingredients of compost (or potting mix), dry cow manure, fungi nutrients and molasses are mixed together, before the fungal spores are sprinkled on top and water is applied by spraying. However, this is not intended to be limiting. Some, all or none of these ingredients may be added; and the skilled person will readily recognise other ingredients that may be added in addition to, or instead of, these.

In one embodiment of the invention, the inventor prepares the fungi subset of the composition by adding 70 grams of compost (or potting mix), three to four grams of cow manure, two grams of oats, one gram of molasses (at a concentration of a gram of molasses to one litre of water) to a shallow tray. A gram of *Arbusular Mycorrhizae* fungi (one gram corresponds to approximately 100 fungal spores) is sprinkled across the tray. Between 10 and 20 millilitres of rainwater is then sprayed over the fungal spores.

The tray is then placed in a warm (between 8 and 25° Celsius), dim (medium grey to light grey according to the 5-Stop Tone Ruler of grayscale density) environment and lightly covered by a lid, such that the ingredients have constant access to air, in particular oxygen. The ingredients are allowed to stand for approximately 72 hours, or until the fungi have germinated.

Water is then added to bring the fungi subset to a 20 litre mixture. However, the fungi subset and the NFB subset could be introduced to each other before the 20 litres is added; this may be more practical when in the field.

For treating a one hectare area of land, this formulation is scaled up by a factor of ten, i.e. 700 grams of compost, 30 to 40 grams of dry cow manure, 20 grams of ground oats, 10 grams of molasses diluted with water, and with ten grams of fungal spores (approximately 10,000 spores, in the case of *Arbuscular Mycorrhizae* fungi) being added to this along with 100 and 200 millilitres of rainwater. The inventor prefers to do this by preparing ten trays using the method described above, but this may be achieved using one or more appropriately sized containers. Rather than 20 litres of water being added, 200 litres is added for sufficient coverage for one hectare. Likewise, the formulation for the NFB subset is also scaled up by a factor of ten.

However, it should be noted that this specific combination of ingredients is not meant to be limiting and there may be differences in quantities and relative proportions depending on the size of area to be treated, the properties of the soil, the specific fungal, bacterial and plant species involved, availability of certain ingredients and their efficacy/potency.

According to another aspect of the present invention, there is provided a method of using a composition to improve or maintain soil health of soil, wherein the method includes the steps of:

adapting the composition as appropriate to the soil health; and delivering the composition to the soil.

Throughout the present specification, reference to adapting the composition as appropriate to the soil health of the soil should be understood to mean that the composition is adapted to contain the types and amounts of ingredients (including NFB, fungi and nutrient-providing ingredients) that are appropriate in light of soil health. The invention may be particularly useful in restoring soil fertility in land not otherwise useful for farming and/or crop production. This has implications for countries with limited land availability or crop production.

As discussed above, the skilled person will be familiar with techniques for determining both soil health and also how the composition should be adapted in light of soil health.

For example, in a preferred embodiment soil health is determined by means of testing the soil prior to delivery of the composition to determine the content of nutrients, NFB and fungi (or any one or more of these) in the soil. The skilled person will readily envisage forms that such tests may take, as well as means for carrying them out and analysing the results.

However, this is not intended to be limiting, and testing may not be required. For example, soil health may already be known; such as because it has already been established for the purposes of preparing the composition. In particular, the inventor envisages that in cases where the composition is being custom-prepared, a soil test may take place at an earlier stage such that appropriate ingredients (as determined by the skilled person) may be included during the actual preparation of the composition.

On the other hand, in cases where the composition is, for example, sold in pre-constituted form, a soil test may take place and the composition adapted as a result.

The composition may be adapted by, for example, adjusting the relative quantities of some or all of the ingredients in the composition; or by dilution, such as with water, to alter its concentration.

For example, the inventor has found that in the case of the composition according to the particularly preferred embodiment thereof described above, it may be desirable to dilute the composition with water by a ratio of 20 litres of water to every 1 litre of the composition. This also allows the water to act as a "carrier" for the composition during delivery of the composition to the soil. However, this is given by way of example only and is not intended to be limiting.

Throughout the present specification, reference to "delivering" the composition to soil should be understood to mean administering the composition to soil to enable the composition to improve or maintain soil health in the manner discussed earlier in this specification.

Preferably, the composition is delivered to the soil such that it is proximate the actual or intended location of roots of plants in the soil.

Even more preferably, the composition is delivered such that it is brought into physical contact with the actual or intended location of plant roots.

Delivering the composition proximate the actual or intended location of plant roots (in particular in physical contact therewith) may be significantly conducive to the fungi integrating with the structure of the roots in the manner discussed earlier in this specification. This in turn may be significantly conducive to the effectiveness of the fungi in delivering nutrients in a plant-available form to the plants. However, this is not intended to be limiting.

It will be understood that delivering the composition to the soil also necessitates ensuring that it is administered in a manner that does not damage the ingredients of the composition.

For instance, it may entail having regard to climatic conditions. The inventor has found that delivering the composition during excessively cold or dry conditions (such as at temperatures below 6° Celsius or when plants in the soil are showing signs of moisture stress) may undesirable from the point of view of the wellbeing of the NFB and fungi in the composition.

It may also entail ensuring that the composition is not subjected to excessive pressure while being delivered to the soil. High pressures may damage one or more of the ingredients of the composition.

Preferably, the composition is subjected to a pressure no greater than 25 psi while it is being delivered. Even more preferably, the composition is subjected to pressure no greater than 12 psi when being delivered to the soil to be treated. However, the skilled person will appreciate that the upper acceptable pressure limit will vary depending on factors such as the specific ingredients and dilution factor of the composition.

Delivering the composition to the soil may also need to have regard to timing. For instance, it may be foreseen by the skilled person that a given soil (and/or crop of plants) will, due to for example impending change of season, become deficient in a particular nutrient (or group of nutrients) at a particular point in the near future. In such a case, it may be preferable to deliver the composition some time prior to the expected deficiency occurring to allow the fungi to convert and store the relevant nutrients in a plant-available form, ready to supplement the soil and nourish the plant when the need arises.

In providing a composition that includes live fungi, the present invention is particularly suited to such strategic application, as it means the composition may be delivered closer to the time of the envisaged nutrient-deficiency than conventional compositions. The latter would require additional time following application for the fungi to germinate and hence become functionally effective in converting and storing nutrients.

Delivering the composition to the soil may also need to take into account the scale on which the composition is desired to be utilised (i.e. the size of the intended area of application.)

For instance, if the area of application of the composition is relatively small such as, for example, under one square metre, the composition may be delivered manually, using a watering can, sprayer, or similar suitable apparatus which will be readily envisaged by the skilled person. Such methods of delivery may also be preferable if, for instance, the plants in the soil are relatively small or delicate, or if they are in the form of seeds or seedlings.

Conversely, if the scale of application of the composition is relatively large such as, for example, in excess of one square metre, other, more practical, means of delivery may be preferable. For instance, a tractor may be used, with a spraying or other liquid/aerosol distributing apparatus mounted thereto for delivering the composition.

In a preferred embodiment, large-scale delivery of the composition is achieved using a tractor with a tractor-mounted aerator that includes aerator blades, as well as a spray tank containing the composition and nozzles mounted to a boom of the tractor for delivering the composition to the soil.

In an even more preferred embodiment, the aerator blades are configured to create spaces in the soil that expose the location (actual or intended) of plant roots; and the tractor includes two booms: the first mounted in front of the aerator blades (relative to the direction of travel of the tractor during application), and the second mounted behind the aerator blades.

In this embodiment, the first boom includes nozzles that are directed at the blades; thus applying the composition to the blades prior to the entry of the blades into the soil such that the blades themselves deliver some of the composition to the soil on entry. The second boom includes nozzles that are aimed at the soil. In particular, these nozzles are oriented such that the composition is directed into the spaces created in the soil by the aerator blades; thereby bringing the composition into physical contact with the location (actual or intended) of the plant roots.

However, this is not intended to be limiting. The skilled person will readily envisage variations of apparatus and means of delivery that are suitable for applying the composition on a large scale.

It will also be appreciated that the manner in which the composition is delivered to the soil may vary depending on the form in which the composition is provided. For example, if the composition is provided in the form of liquid-centred capsules, the manner of delivering it to the soil may need to be adapted accordingly; the skilled person will readily envisage how the above-discussed exemplary modes of large- and small-scale delivery may be adapted in such a case, as well as other appropriate modes of delivery.

It will also be appreciated that the method may include additional steps. In particular, the method may include supplementary steps undertaken after the composition has been delivered to the soil. For example, the method may include repeated delivery of the composition, as deemed necessary by the skilled person having regard to soil health and other relevant considerations.

The method may also include delivering additional quantities of selected ingredients to the soil following initial delivery of the composition. For example, supplementary quantities of nutrient-providing ingredients such as fungi nutrients and/or molasses may be delivered to the soil at a later stage, as deemed appropriate by the skilled person. This may be beneficial to soil health as well as to the continued reproduction and function of the NFB and/or fungi.

It will be understood that delivering the composition to the soil may also be affected by a range of further factors, which the skilled person will readily envisage; including but not limited to the type of soil, and the type of plants grown (or intended to be grown) in the soil.

As will be appreciated from the preceding discussion of the present invention, it has a number of advantages over existing systems and methods for promoting soil health; these may include but are not limited to:
- Provides a composition that is functionally effective immediately following application to the soil and without the need for a "germination period";
- Provides a composition which may have a significantly greater initial population of live NFB and/or fungi than conventional compositions, due to the NFB and/or fungi being allowed to germinate in controlled environmental conditions;
- Provides a composition wherein the population is established and may grow more quickly in time (following application), as compared to conventional compositions;
- Provides NFB and/or fungi which may be, at the level of individual microorganisms, more "lively" than those of conventional compositions; hence also potentially results in greater effectiveness in improving soil health;
- Provides potentially significant benefits for soil health, which may include superior soil nutrient content and cycling, and superior resistance of soil to climactic and other conditions;
- Provides a means of potentially "unlocking" existing nutrients in soil and making them available to plants;
- Provides a natural means of improving the amount of anaerobically mineralisable nitrogen that is available to plants, potentially reducing or eliminating the need to apply petrochemical-based fertilisers to soil;
- Provides benefits for crop yield, as well as plant quality and health;
- If the crops being grown are for consumption by livestock, may provide a better diet for livestock due to the superior quality and health of the crops; thus potentially improving the health of livestock;
- May increases the rate of plant establishment and survival at seeding or transplanting;
- Provides a cost-effective soil health solution as compared to conventional compositions, by virtue of significantly reduced ingredient wastage at the point of application, and subsequently, less frequent repeat applications due to the superior effectiveness of the composition;
- May help to prevent leaching of harmful products which may be present in the soil into streams or waterways, due to the biochar absorbing these products and containing them in the soil;
- At the very least, the present invention provides the public with a useful choice.

BRIEF DESCRIPTION OF FIGURES

Further aspects of the present invention will become apparent from the following description which is given by way of example only and with reference to the accompanying drawings in which.

BEST MODES FOR CARRYING OUT THE INVENTION

In all the Figures, like features are assigned a like numeral.

Figure 1:
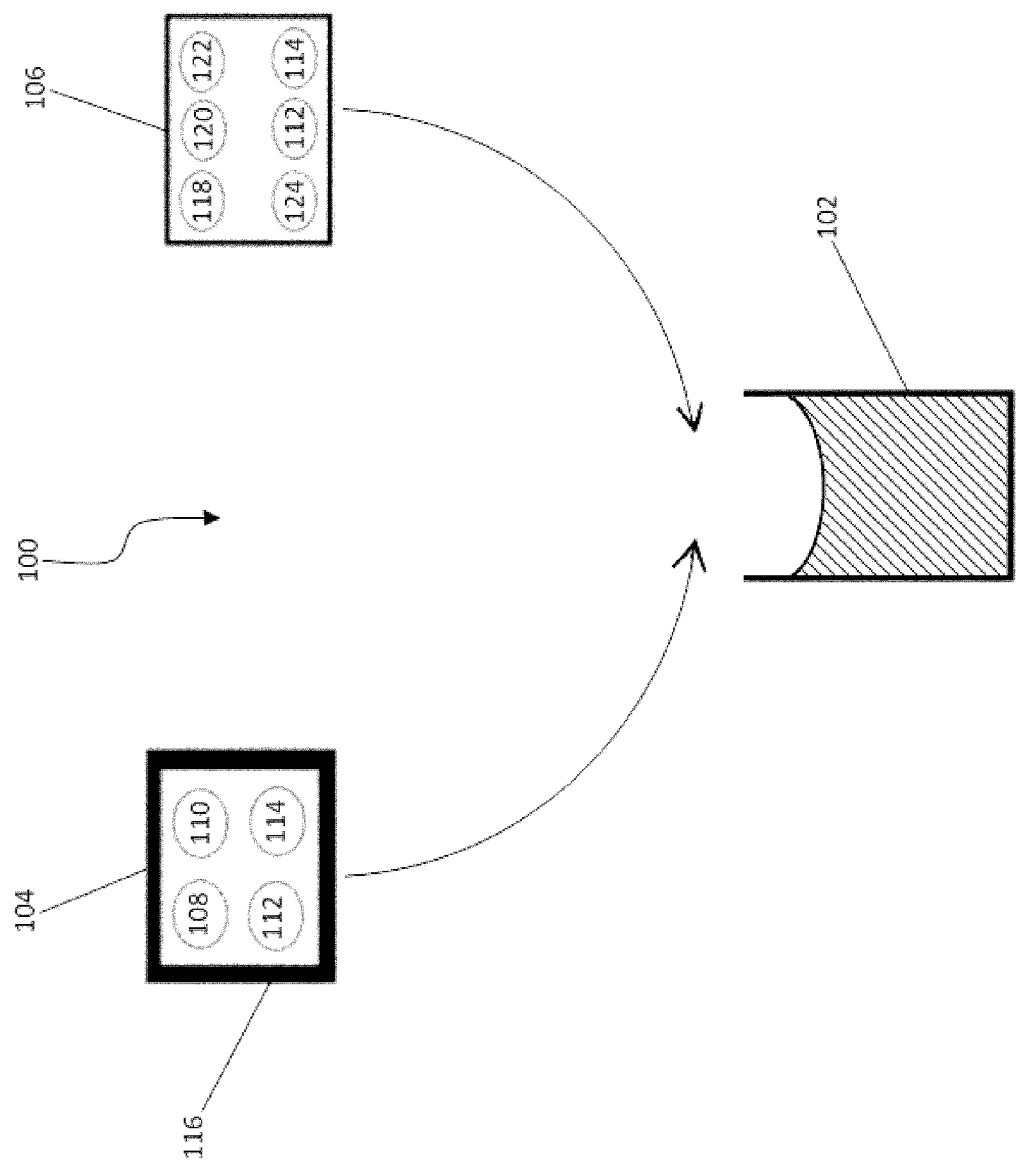
FIG. 1 is a schematic showing the ingredients of a composition to promote soil health according to a preferred embodiment of the present invention.

FIG. 1 is a schematic showing the ingredients (generally indicated by 100) of a composition (102) to promote soil health according to a preferred embodiment of the present invention. It will be seen that the composition (102) comprises two main subsets (104, 106) of ingredients (100), which are prepared individually (as discussed in respect of FIGS. 2 and 3) then combined to produce the composition (102).

One subset (104) includes the bacteria (the bacterial subset); specifically *Azotobacter Chroococcum* (108). It also includes additional nutrients in the form of fishmeal (110), molasses (112) and water (114). These ingredients are adsorbed into biochar (116), which acts as a base therefor when the composition (102) is prepared and applied to the soil.

The other subset (106) includes the fungi (the fungal subset); which for many plants forms an *Arbuscular Mycorrhizae* (118) type relationship with roots of plants. It also includes compost (or potting mix) (120), dry cow manure (122) ground oats (124), molasses (112) and water (114).

Figure 2:
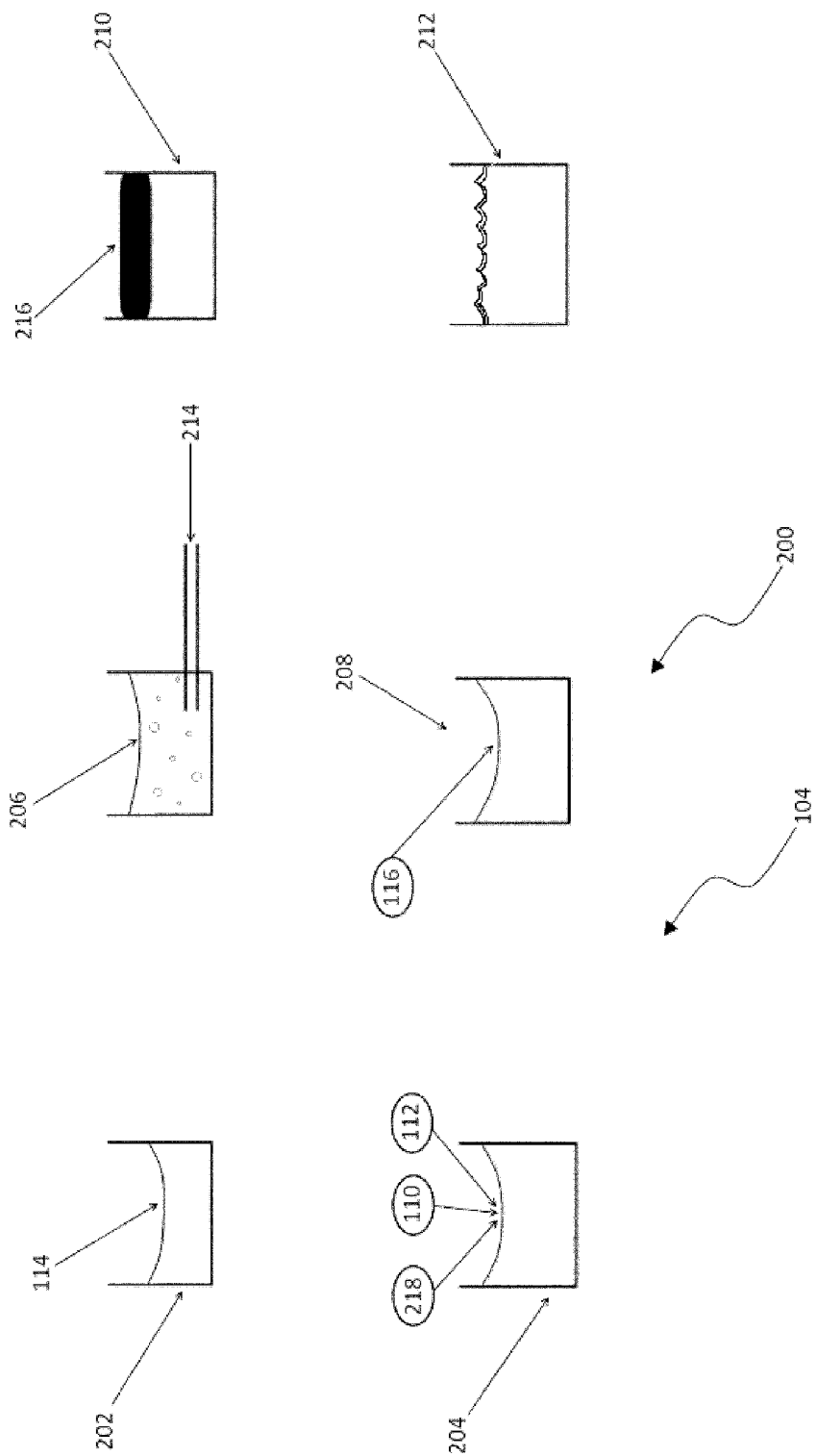
FIG. 2 is a schematic showing a method of preparing the bacterial subset of ingredients for a composition to promote soil health according to the same embodiment of the present invention.

FIG. 2 is a schematic showing a method (generally indicated by 200) of preparing the bacterial subset (104) of ingredients for the composition to promote soil health of FIG. 1. In the first step (202), 30 litres of water (114) are poured into a plastic container.

In the second step (204), 30 grams of NFB spores (218), 50 grams of fishmeal (110), and 10 grams of molasses (112) are combined with the water (114) to form a solution. In the third step (206), this solution is aerated and agitated for a period of 24 hours using an aerator (214) and, optionally, air stones (not shown).

In the fourth step (208), 10 litres of biochar (116) are added; and in the fifth step (210), a sinking lid (216) is placed on top of the solution in order to submerge the biochar, thereby helping ensure the other ingredients are adsorbed into it as completely as possible. The sinking lid (216) also helps to distribute air throughout the solution, thereby helping ensure the NFB spores (218) have continuous access to oxygen. The solution is allowed to remain like this until it begins to foam (as shown in the sixth step, 212), indicating the NFB (not shown) have germinated.

Figure 3:
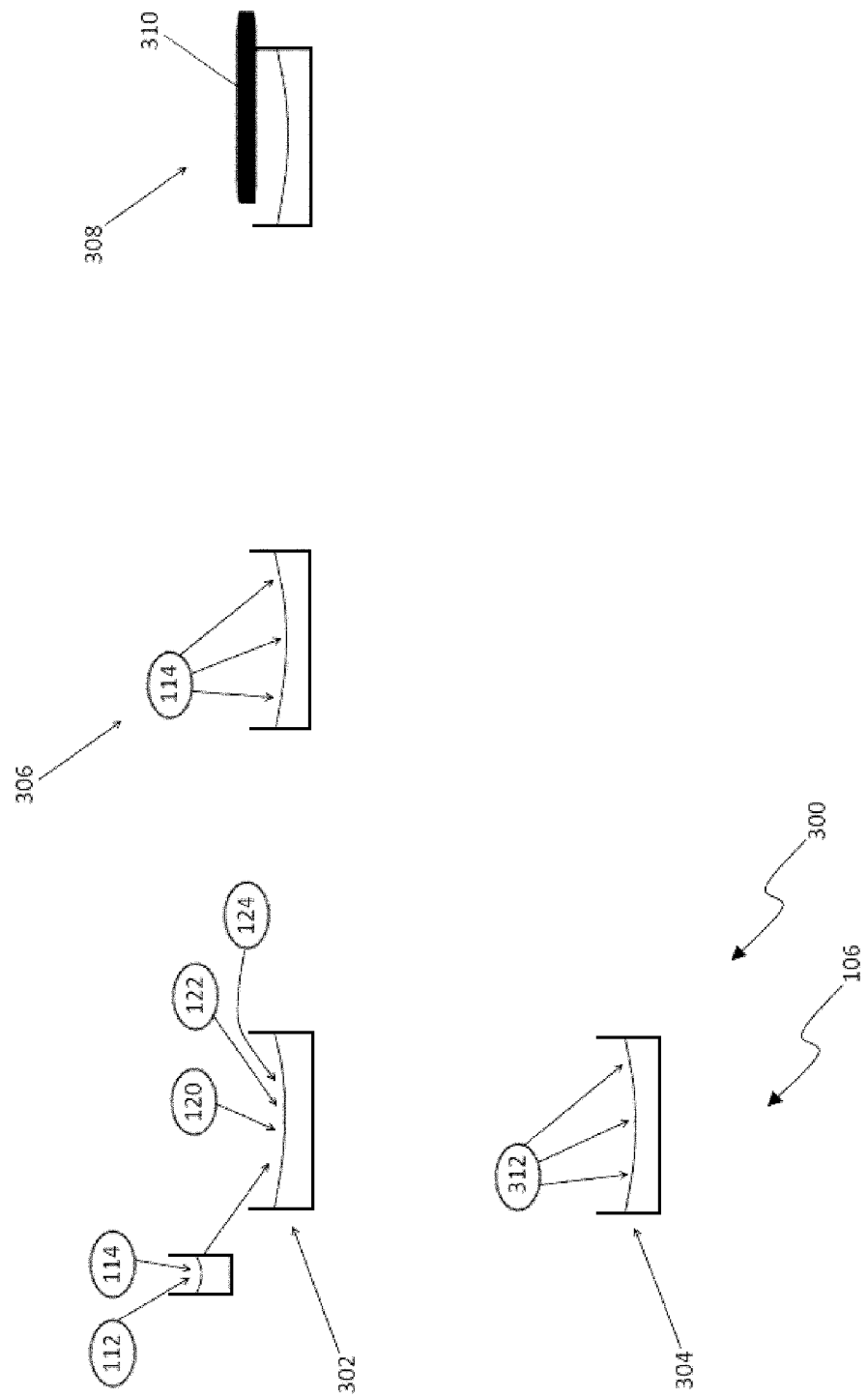
FIG. 3 is a schematic showing a method of preparing the fungal subset of ingredients for a composition to promote soil health according to the same embodiment of the present invention.

FIG. 3 is a schematic showing a method (generally indicted by 300) of preparing a 20 litre mix of the fungal subset (106) of ingredients for the composition to promote soil health of FIG. 1.

In the first step (302), 70 grams of compost or potting mix (120), 3 to 4 grams of dry cow manure (122) and 2 grams of ground oats (124) are combined in a container or tray with 6 grams of molasses (112) diluted with water (114) at a concentration of 1 gram molasses to 1 litre of water.

In the second step (304), this is sprinkled over with 1 gram of fungal spores (312); this equates to approximately 100 spores, in the case of *Arbuscular Mycorrhizae*. In the third step (306), between 10 and 20 millilitres of rainwater are sprayed over the fungal spores.

Finally, in the fourth step (308) the ingredients so combined are placed in a warm (between 8 and 25° Celsius), dim (medium grey to light grey according to the 5-Stop Tone Ruler of grayscale density) area and lightly covered by a lid (310), such that the ingredients have constant access to air, in particular oxygen. The container is allowed to stand for approximately 72 hours, or until the fungi (not shown) have germinated.

Rainwater (not shown) is then added to bring the mixture to 20 litres and this is combined with the NFB subset. The resulting combination is appropriate for an area of land of approximately 100 m$^2$; for larger areas, the ingredients of the respective composition may be proportionally increased as required.

Figure 4A:
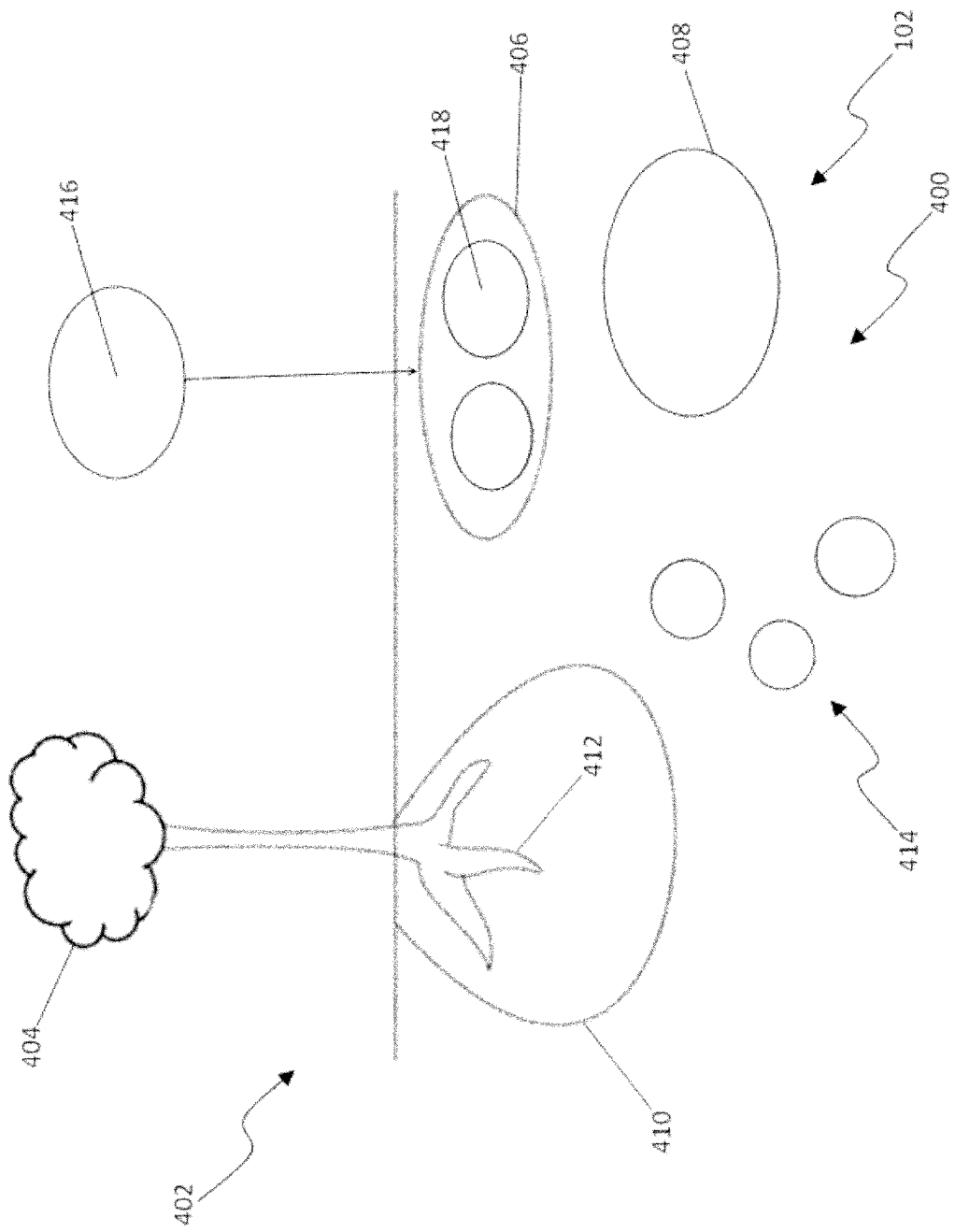
FIG. 4*a* is a schematic showing the first stage of the process by which a composition to promote soil health according to the same embodiment of the present invention provides nutrients to soil and plants.

Turning now to FIG. 4a, which is a schematic showing the first stage of a process (generally indicated by 400) by which the composition (102) to promote soil health according to FIG. 1 provides nutrients to soil (402) and plants (404).

It will be seen that the NFB (406), nutrients (408) and fungi (410) of the composition (102) have been applied to the soil (402). The composition (102) has been applied proximate the roots (412) of the plant (404). In particular, the fungi (410) have been applied such that they are in physical contact with the roots (412) of the plant. This is important as it allows the fungi (410) to integrate with the roots (412), forming arbuscule (not shown). It will also be seen that the soil (402) contains various nutrients (414) that were already present in the soil (402) prior to the application of the composition (102).

It will be seen that the NFB (406) draws nitrogen gas (416) from the air and fix it in the soil (402) by converting it into nitrogen compounds (418) such as ammonium, nitrates or nitrites.

Figure 4B:
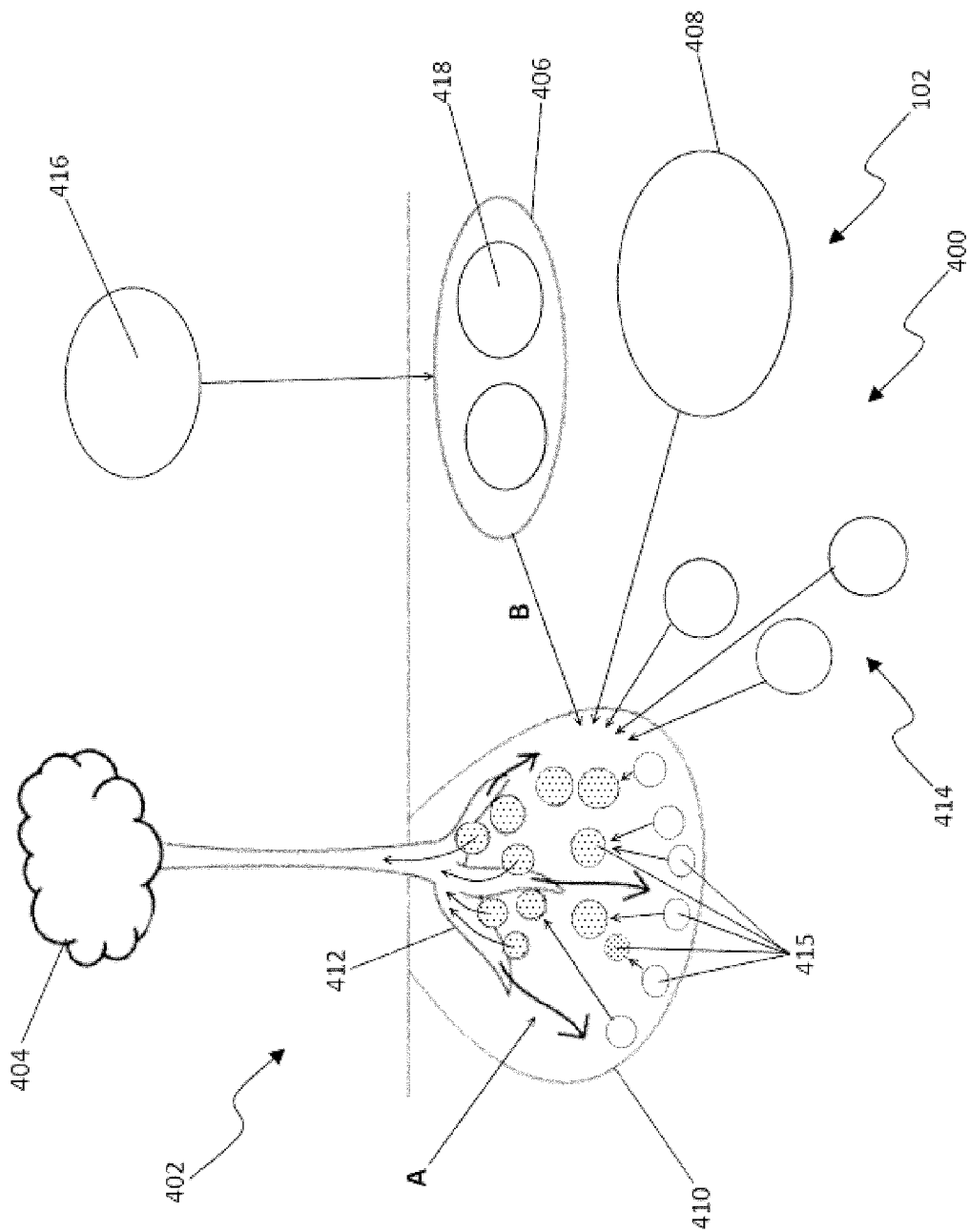
FIG. 4*b* is a schematic showing a further stage of the process by which a composition to promote soil health according to the same embodiment of the present invention provides nutrients to soil and plants.

FIG. 4b is a schematic showing a further stage of the process (generally indicated by 400) by which the composition (102) to promote soil health according to FIG. 1 provides nutrients to soil (402) and plants (404).

It will be seen that the nutrients (408, 414) interact with the fungi (410), whereupon the fungi convert the nutrients (408, 414) into a plant-available form (415). The fungi (410) then enable the nutrients in a plant-available form (415) to be transmitted to, and absorbed by, the roots (412) of the plant (404). It will also be seen that the nitrogen compounds (418) fixed in the soil (402) by the bacteria (406) are transmitted to the plant roots (412) by the fungi (410), as generally indicated by arrow B. This occurs upon the death of the bacteria (406).

In exchange, the plant (404) releases sugars and carbon-dioxide via its roots (412) (as generally indicated by arrows A), off which the fungi (410) thrive. Thus, a symbiotic relationship is established between plant and fungi.

Figure 4C:
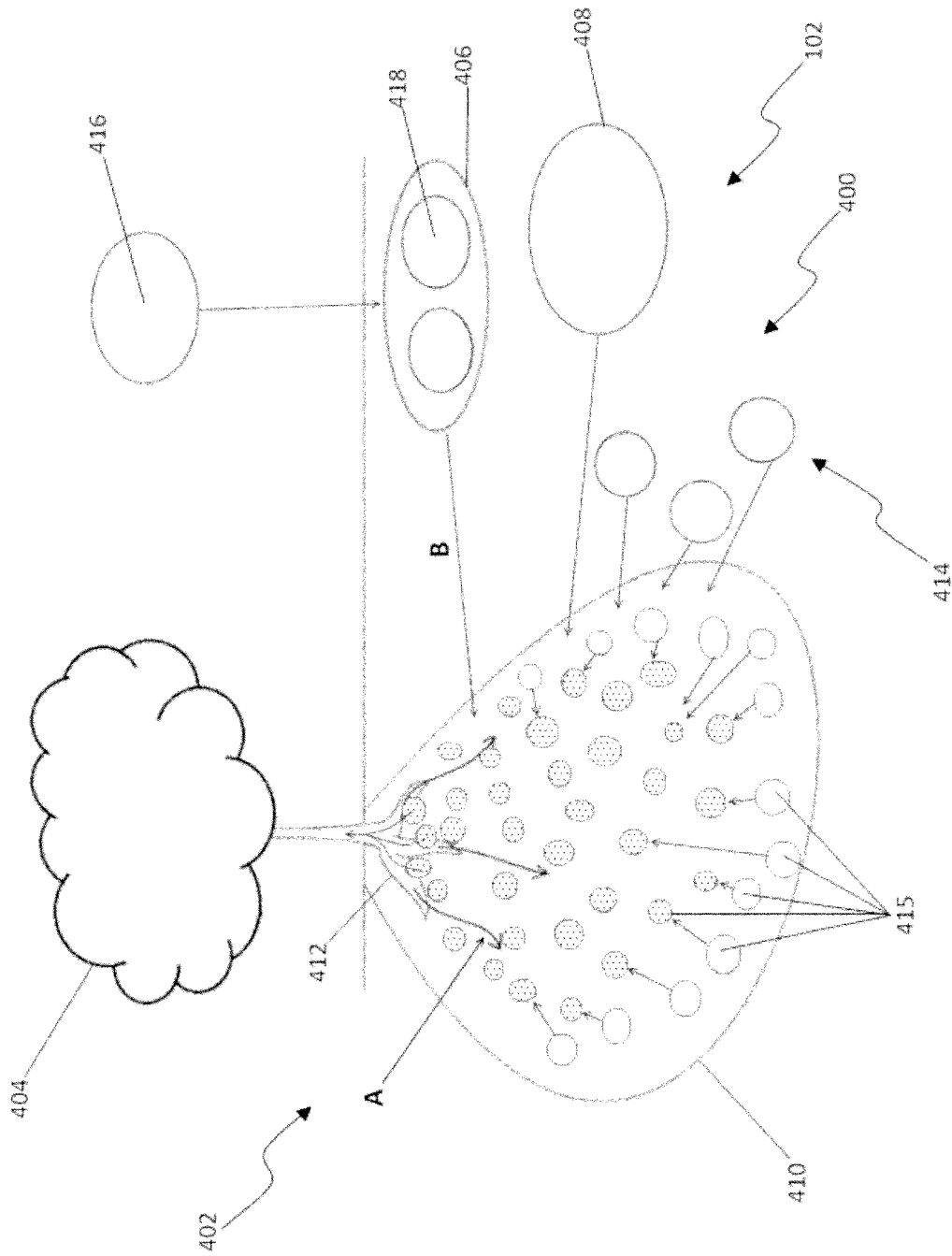
FIG. 4*c* is a schematic showing yet a further stage of a process by which a composition to promote soil health according to the same embodiment of the present invention provides nutrients to soil and plants.

FIG. 4c is a schematic showing yet a further stage of the process (generally indicated by 400) by which the composition (102) to promote soil health according to FIG. 1 provides nutrients to soil (402) and plants (404).

As the process seen in FIG. 4b continues, the plant (404) and fungi (410) progressively nourish one another. Thus, the population of fungi (410) grows, meaning the fungi (410) are able to transform nutrients (408, 414) into a plant-available form (415) at a faster rate; and hence deliver more plant-available nutrients (415) as well as nitrogen compounds (418) to the roots (412) of the plant (404); causing the plant (404) to become better-nourished. The plant (404) continues to release sugars and carbon-dioxide (generally indicated by arrows A) via its roots (412), providing further sustenance to the fungi (410). This reinforces the symbiotic relationship between plant (404) and fungi (410).

In a trial, the composition of the present invention was applied to soil concurrently with the planting of young stone fruit plantings (which were too young to produce a fruit crop in the season in question). In this trial, five rows of plantings were established, with 100 plantings per row. The composition of the present invention was applied to the second and fourth rows. The remaining rows were untreated. The five rows were maintained identically throughout cultivation.

It was observed that the second and fourth rows entered the "budbreak" stage noticeably earlier than the remaining rows; and with a greater number of buds. Likewise, flowering took place earlier in the second and fourth rows, with a greater number of flowers. Branch growth was also superior in the second and fourth rows, with more rapid tree growth and larger ultimate tree size.

Furthermore, uniform growth patterns were observed in the second and fourth rows. The trees in these rows also showed no indications of stress, in spite of periods of unfavourable climactic conditions (drought) during the trial period.

Potentially available nitrogen, which is the amount of nitrogen in the soil, improved from an initial 136 kilograms per hectare (kg/ha) to 180 kg/ha within six months of the application of a composition as substantially herein described. However, the nitrogen still needs to be made available to the plants in a useful form; i.e. it has to be mineralised by the fungi present in the soil.

In this case, because of the increase in fungi in the soil as a result of the application of the composition, anaerobically mineralisable nitrogen increased from 104 micrograms/gram (μg/g), which is at the lower end of what is considered to be adequate for soil, [1] to 135 (μg/g), which is much more adequate.

[1] See: https://sindi.landcareresearch.co.nz/Content/HelpMineralisableN.html

To achieve a similar effect using petrochemical-based fertilisers would require such a substantial amount that there may a risk of leaching and runoff into nearby waterways. This is one reason why the use of the present composition, which encourages greater mineralisation of nitrogen, is advantageous.

Favourable results are not limited to stone fruits. For example, a notable increase in potentially available nitrogen was observed in soils in which hops were cultivated. Initially, potentially available nitrogen was measured as being 125 kg/ha. Five months after application of a composition formulated according to the present invention, potentially available nitrogen was 158 kg/ha.

Meanwhile, anaerobically mineralisable nitrogen increased from 88 micrograms/gram (μg/g), which is relatively low, to a more adequate 108 (μg/g).

In a further example, in trials conducted on pine tree plantations it was found that when a composition substantially as herein described was applied to the soil, after five months, the potentially available nitrogen (to a 150 mm depth) was determined to be 137 kg/ha. In contrast, in soil where the composition was not applied, the potentially available nitrogen (to a 150 mm depth) was 132 kg/ha. This is a difference of five kilograms per hectare of nitrogen. Furthermore, the trees grown in the treated soil were found to show up to a 100% increase in growth relative to control trees grown in untreated soil. This is a significant difference in biomass, which has clear implications for crop cultivation.

Figure 5:
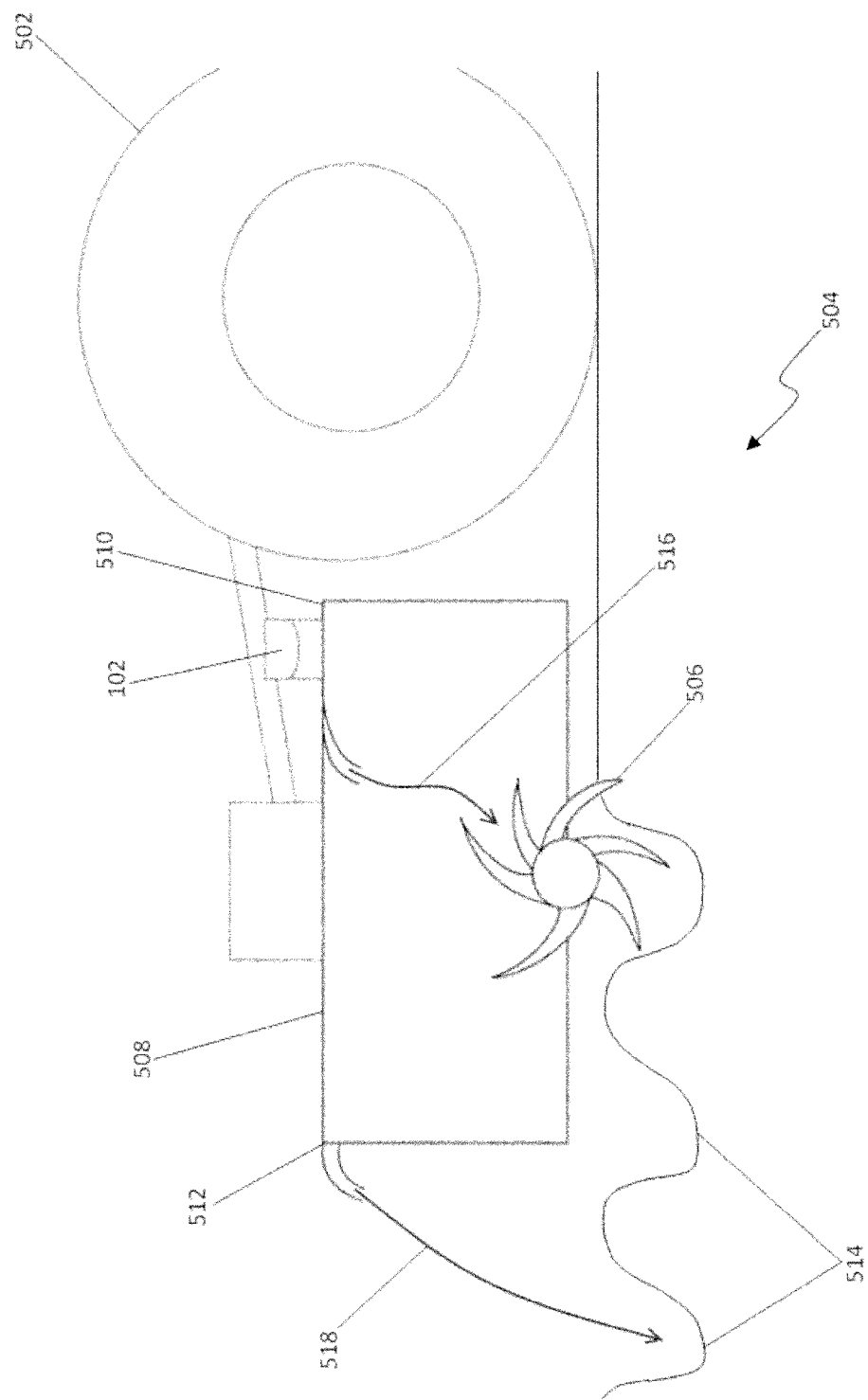
FIG. 5 is a schematic showing a method of applying a composition to promote soil health according to another preferred embodiment of the present invention.
Figure 6A:
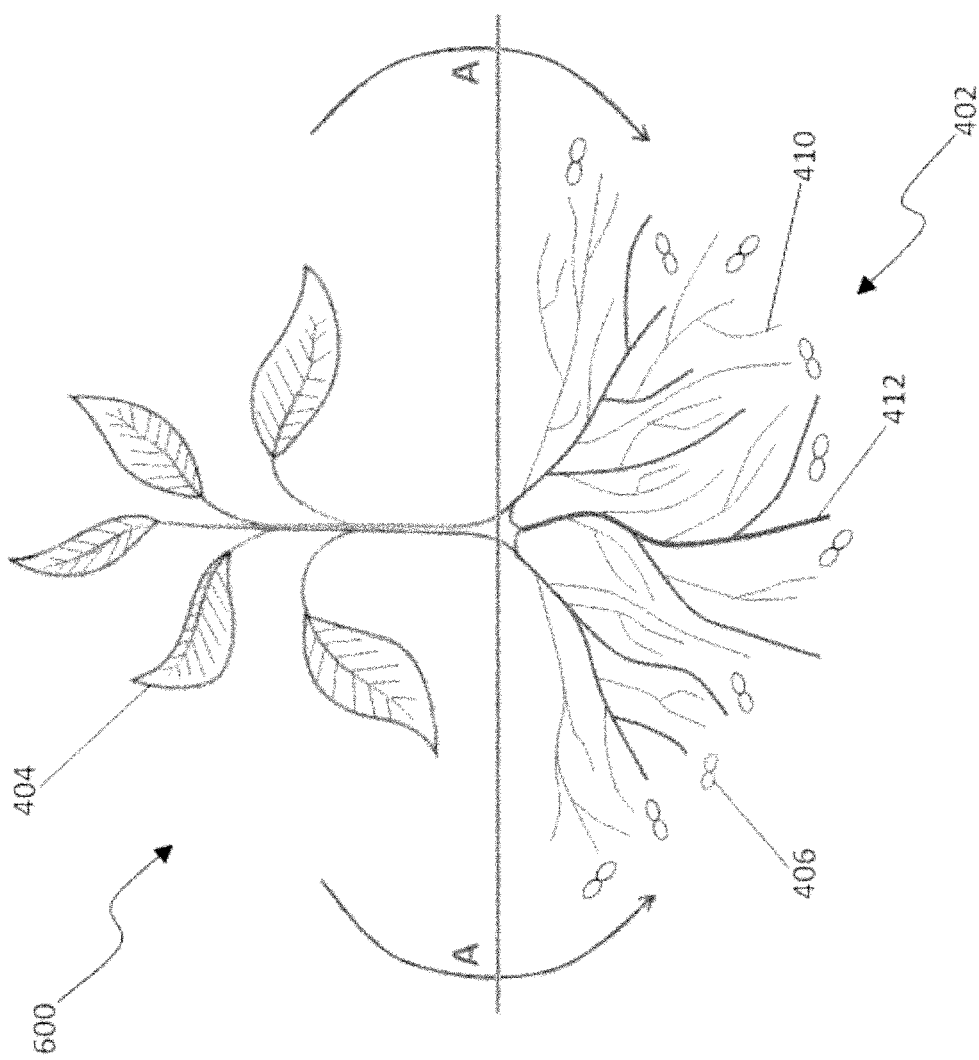
FIG. 6*a* is a schematic showing the operation of the fungi and nitrogen-fixing bacteria of the composition according to the embodiment of FIGS. 1 to 3.
Figure 6B:
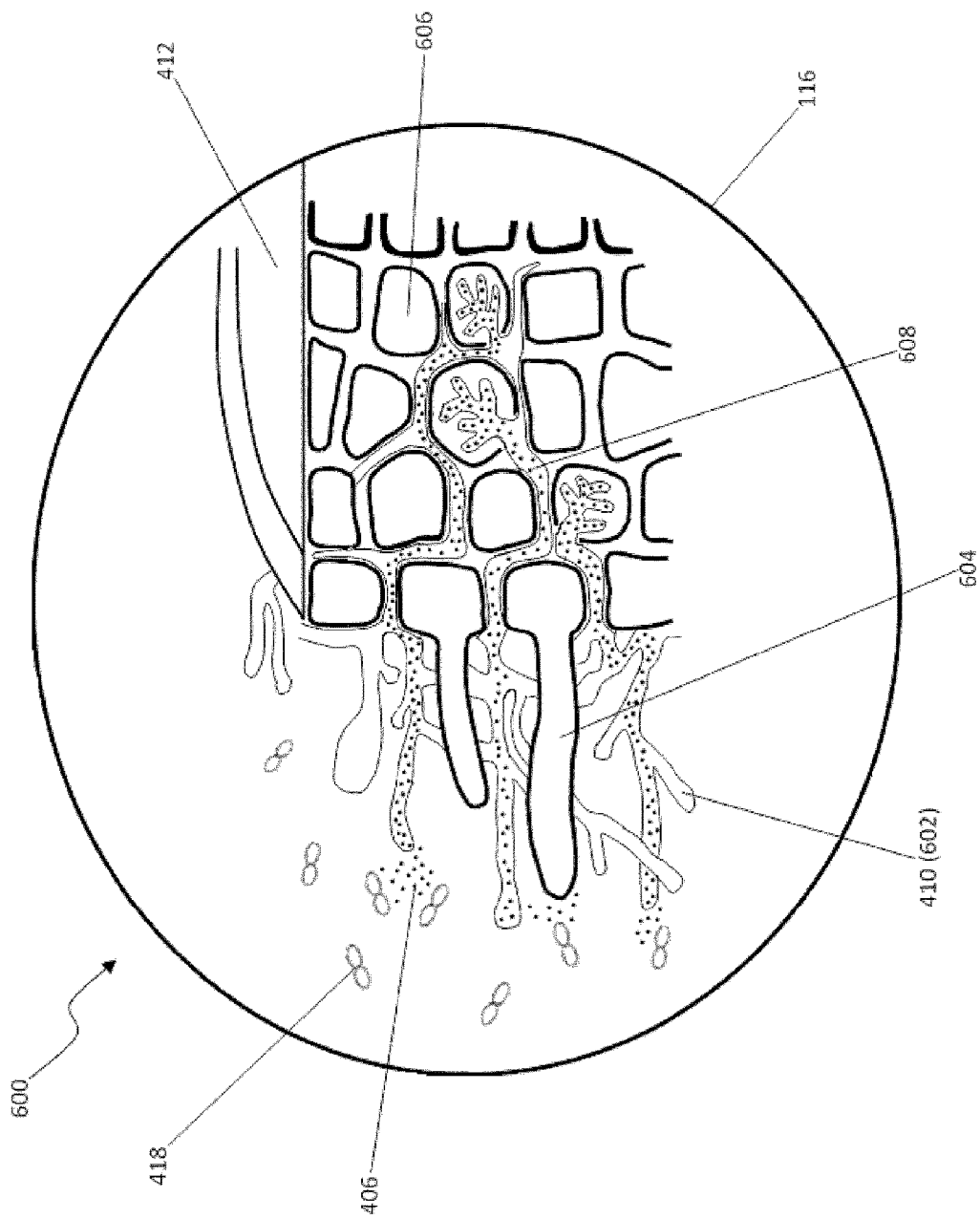
FIG. 6*b* is another schematic showing the operation of the fungi and nitrogen-fixing bacteria of the composition according to the same embodiment.

Turning now to FIG. 5, which is a schematic showing a method (generally indicated by 500) of applying a composition (102) to promote soil health according to another preferred embodiment of the present invention.

A tractor (502) is fitted with a tractor-mounted aerator (504). The tractor-mounted aerator (504) includes aerator blades (506) pivotally mounted to a supporting structure (508) that includes a first boom (510) and a second boom (512).

In use, as the tractor (502) travels forward, the aerator blades (506) rotate, causing furrows (514) to be created in the soil (402). In this embodiment, the length of the aerator blades (506) has been adapted to ensure that the furrows (514) created in the soil (402) expose the actual or intended location of the roots (not shown) of plants (not shown).

The first boom (510) is located forward of the aerator blades (506) relative to the direction of motion of the tractor (502) in use. The second boom (512) is located to the rear of the aerator blades (506) relative to the direction of motion of the tractor (502) in use. Affixed to the first boom (510) is a first set of nozzles (516). The second boom (512) bears a second set of nozzles (518).

The first set of nozzles (516) is configured to direct the composition (102) onto the aerator blades (506) prior to their entry into the soil (402), thereby coating the aerator blades (506) with the composition (102) such that, on entry into the soil (402), the aerator blades (506) administer at least some of the composition (102) to the soil (402). The second set of nozzles (518) is configured to direct the composition (102) into the furrows (514) created in the soil (402) by the aerator blades (506). Thus the composition (102) is brought into contact with the actual or intended location of the roots (not shown) of plants (not shown).

Turning now to FIG. 6*a*, this is a schematic showing the operation (generally indicated by 600) of the fungi (410) and NFB (406) of the composition (not shown) prepared as discussed in relation to FIGS. 1 to 3.

It will be seen that the fungi (410), an *Arbuscular mycorrhiza*, of the composition form a symbiotic relationship with the roots (412) of the plant (404). The fungi (410) have hyphae which extend into the soil (402), forming "highways" via which nutrients can be delivered to the roots (412) of the plant (404), and thereby ingested by the plant (404). The NFB (406) of the composition draw nitrogen (not shown) from the air (as generally indicated by arrows A), and "fix" it in the soil (402). The NFB (406) also convert the nitrogen (not shown) into nitrogen compounds (not shown).

FIG. 6*b* is another schematic showing the operation (generally indicated by 600) of the fungi (410) and NFB (406) of the composition (not shown). Specifically, FIG. 6*b* shows the transfer of nitrogen compounds (418) from the NFB (406) to the plant roots (412).

It can be seen that the fungi (410) form arbuscules (608) between the cells (606) of the plant root (412). The hyphae (602) of the fungi (410) are also shown extending from the root (412) into the soil, between the root hairs (604) of the root (412).

When the NFB (406) die (such as by being consumed by "predators" in the soil), they release nitrogen compounds (418) into the soil. The nitrogen compounds (418) travel along the hyphae (602) of the fungi (410), and enter the plant root (412) via the arbuscule (608). They are then able to be ingested by the plant. Both the NFB (406) and the fungi (410) are hosted and protected by the biochar of the composition (notionally represented by 116). The biochar (116) is also conducive to the formation of "lattices", or networks, of hyphae (602), in providing a porous substance within which such lattices may develop. The development of lattices or networks of hyphae may significantly increase the efficacy of the fungi (410) in transporting nutrients from the soil to the plant root (412).

The entire disclosures of all applications, patents and publications cited above, if any, are herein incorporated by reference. Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope thereof as defined in the appended claims.

What is claimed is:

1. A composition to improve or maintain soil health, wherein the composition includes:
   water;
   a base;
   nitrogen-fixing bacteria;
   fungi, wherein the nitrogen-fixing bacteria and fungi are present in the composition in a live state, and wherein the composition also includes a source of protein derived from oats, and wherein the protein is avenalin.

2. The composition as claimed in claim 1, wherein the composition also includes additional, nutrient-providing ingredients.

3. The composition as claimed in claim 2, wherein the additional, nutrient-providing ingredients are one or more of the following: molasses; glucose; compost; cow manure; fats; b-vitamins.

4. The composition as claimed in claim 1, wherein the base is a carbon-based substance.

5. The composition as claimed in claim 4, wherein the base is one or more of the following: pumice; wood or woodchips; biochar.

6. The composition as claimed in claim 1, wherein the nitrogen-fixing bacteria are of the *Azotobacter* family.

7. The composition as claimed in claim 6, wherein the nitrogen-fixing bacteria are *Azotobacter Chroococcum*.

8. The composition as claimed in claim 1, wherein the fungi are Mycorrhizal.

9. The composition as claimed in claim 8, wherein the fungi are one or more of *Arbuscular Mycorrhizae; Ectomycorrhiza; Ericoid mycorrhiza*.

10. A method of preparing a composition to improve or maintain soil health, wherein the composition includes:
    water;
    a base;
    fungi; and
    nitrogen-fixing bacteria, wherein the nitrogen-fixing bacteria and fungi are present in the composition in a live state; and wherein the composition also includes a source of protein derived from oats, wherein the protein is avenalin, wherein the nitrogen-fixing bacteria is prepared in accordance with the steps of:
    a) combining nitrogen-fixing bacterial spores and water in a mixture; and
    b) maintaining the mixture of nitrogen-fixing bacterial spores and water in contact with air until the nitrogen-fixing bacterial spores germinate;
    and wherein the fungi is prepared in accordance with the steps of:
    c) combining fungal spores and water in a mixture; and
    d) maintaining the mixture of fungal spores and water in contact with air until the fungal spores germinate;
    and wherein the method of preparing the composition includes the step of:
    e) combining the mixture of step b) with the mixture of step d).

11. The method as claimed in claim 10, wherein the nitrogen-fixing bacterial spores are of the *Azotobacter* family and wherein the fungi spores are Mycorrhizal.

12. The method as claimed in claim 11, wherein the nitrogen-fixing bacterial spores are *Azotobacter Chroococcum* and wherein the fungi spores are one or more of the type: *Arbuscular Mycorrhizae; Ectomycorrhiza*; and *Ericoid mycorrhiza*.

13. The method as claimed in claim 10, wherein the water of steps a) and c) is one or more of: rainwater; tap water; bore water.

14. The method as claimed in claim 10, wherein there is an additional step of one or more of:
    a) aerating the mixture under pressure;
    b) agitating the mixture;
    c) adding further nutrient-providing ingredients to the mixture;
    d) adding a base to the mixture.

15. The method as claimed in claim 14, wherein, in step c), the further nutrient-providing ingredients are one or more of: fishmeal; molasses; glucose; compost; potting mix; dry cow manure.

16. The method as claimed in claim 14, wherein, in step d), the base is biochar.

17. A method of using a composition to improve or maintain soil health of soil, wherein the composition includes water; a base; fungi; and nitrogen-fixing bacteria, wherein the nitrogen-fixing bacteria and fungi are present in the composition in a live state; and wherein the composition also includes a source of protein derived from oats, wherein the protein is avenalin, and wherein the method includes the steps of:
    a) adapting the composition as appropriate to the soil health; and
    b) delivering the composition to the soil.

18. The method as claimed in claim 17, wherein the step of adapting the composition is:
    a) changing relative quantities of some or all of the ingredients in the composition to compensate for the absence or quantities of such ingredients already in the soil; or
    b) diluting the composition with water to alter its concentration.

19. The method as claimed in claim 17, wherein the composition is delivered to the soil such that it is brought into physical contact with the actual or intended location of plant roots.

20. The method as claimed in any claim 17, wherein the composition is delivered via a sprayer.

* * * * *